Feb. 20, 1940. J. J. McBRIDE 2,190,723
TOP OPERATED OUTLET VALVE
Filed Dec. 24, 1936 2 Sheets-Sheet 2
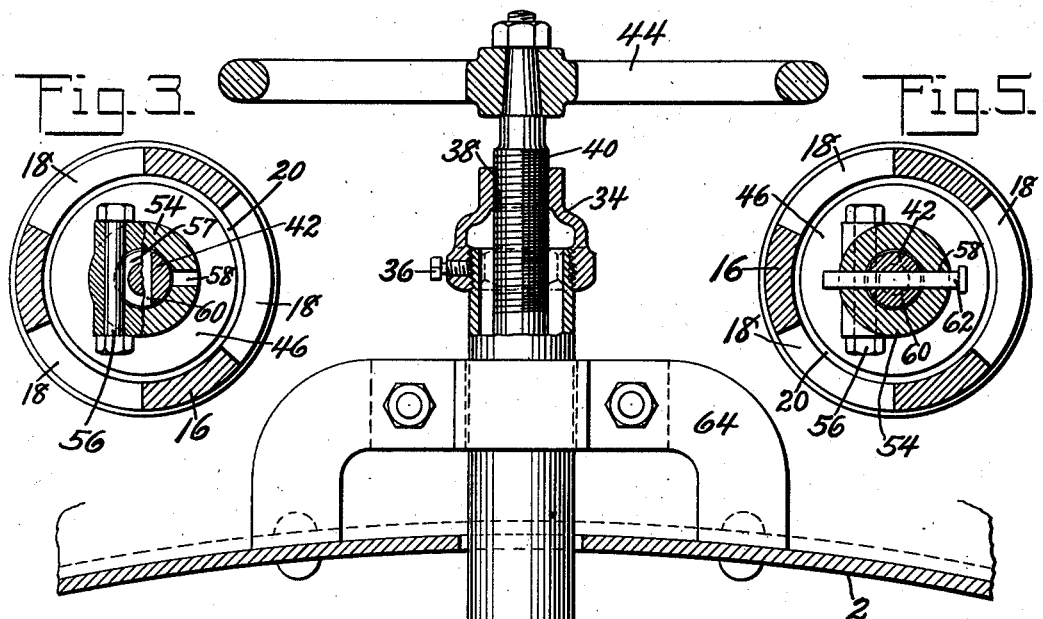
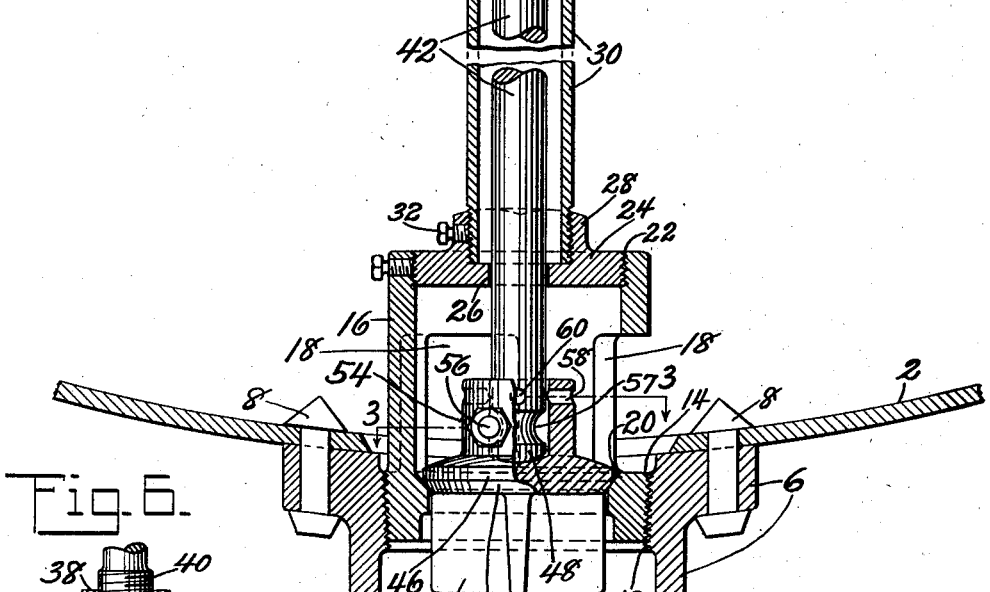
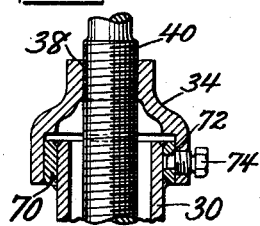
INVENTOR
John J. McBride
BY
ATTORNEY Patented Feb. 20, 1940

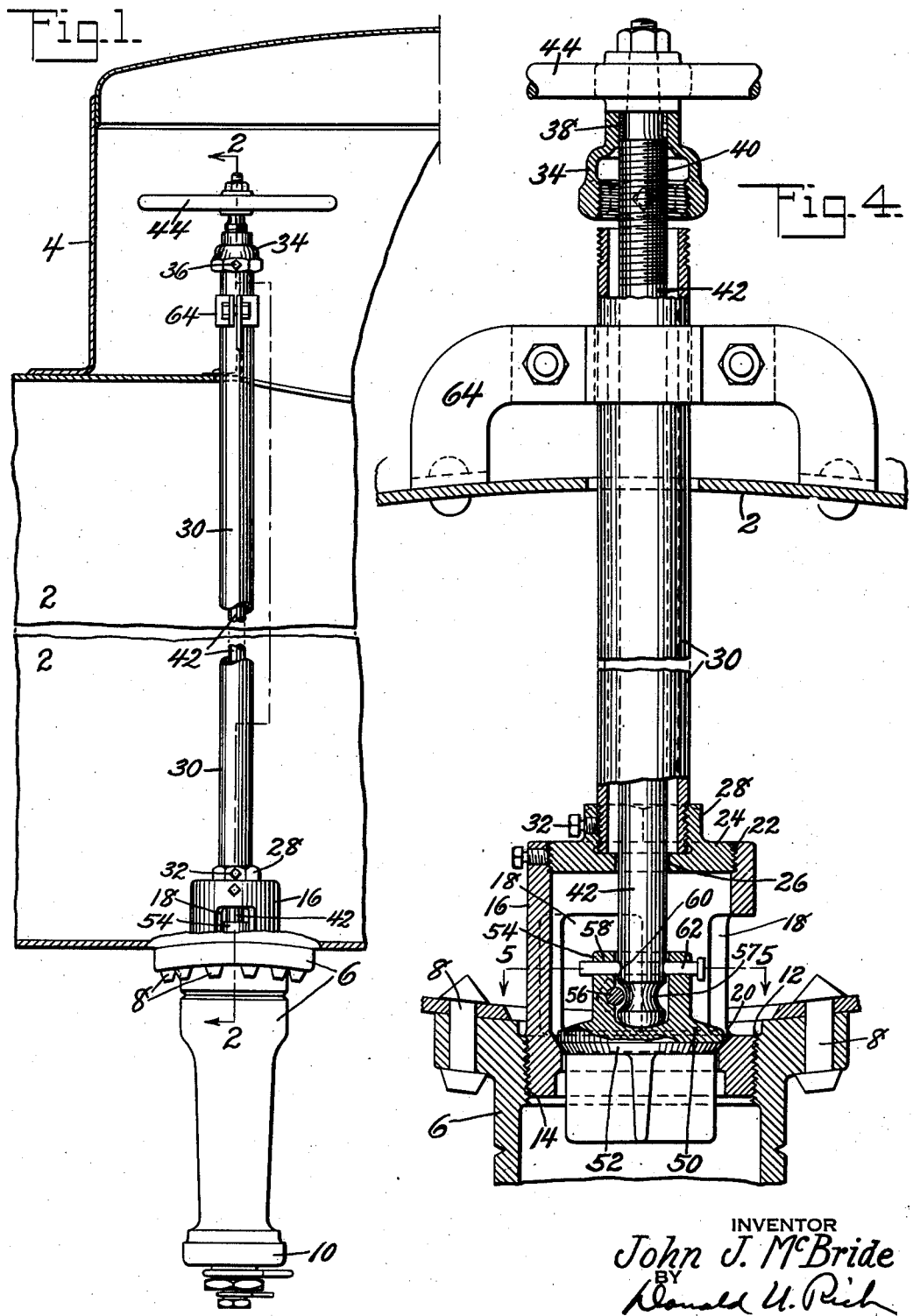

2,190,723

UNITED STATES PATENT OFFICE 2,190,723

TOP OPERATED OUTLET VALVE

John J. McBride, Bayonne, N. J., assignor to American Car and Foundry Company, New York, N. Y., a corporation of New Jersey Application December 24, 1936, Serial No. 117,501

1 Claim. (Cl. 137—21)

This invention relates to tank valves in general and in particular to discharge valves wherein the operating threads do not come in contact with the lading.

Previous forms of discharge valves have had the operating threads for the valve adjacent the outlet and, therefore, immersed in the lading of the tank. Certain ladings have a tendency to crystallize, or form deposits, on the threads rendering the valve inoperative, or at least hard to operate. It is an object, therefore, of this invention to provide a valve wherein the operating threads are protected from the lading.

Another object of the invention is the provision of a top operated valve which may be readily ground.

Still another object of the invention is the provision of a top operated valve which is free of connection to the tank other than at the bottom in order that temperature changes will not affect the valve position.

These and other objects of the invention will be apparent to persons skilled in the art from a study of the following description and accompanying drawings, in which:

Figure 1 is a sectional view of a portion of a tank showing the location of the outlet valve mechanism;

Fig. 2 is a sectional view of the valve mechanism taken on line 2—2 of Fig. 1;

Fig. 3 is a sectional view of the valve taken on line 3—3 of Fig. 2;

Fig. 4 is a view similar to Fig. 2 but showing the valve in position for grinding;

Fig. 5 is a sectional view taken on line 5—5 of Fig. 4, and

Fig. 6 is a sectional view showing a slightly modified form of securing means for the top cap.

Referring now to the drawings in detail, it is seen that the valve is shown as applied to a tank having shell 2 and customary dome 4. The outlet casting 6 is secured to the tank shell in any suitable manner as by rivets 8 and is provided with the usual cap 10 and internal threads 12. The internal threads of the casting are adapted to receive the threads 14 of the valve cage 16 which is of cylindrical form, having a plurality of ports 18 formed in the sides thereof and provided with bevel valve seat 20.

The upper end of the valve cage is provided with internal threads 22 which receive the external threads of a lower or cage cap 24. The lower or cage cap is formed with a central opening 26 which serves as a guide for the valve rod, and with an upstanding central portion 28 adapted to receive the lower end of supporting or thrust pipe 30. The supporting or thrust pipe may be threaded into the lower cap and held by set screw 32 or it may be welded or otherwise secured to the cap as is obvious.

The upper end of the supporting or thrust tube carries an upper cap 34 which, as shown in Fig. 2 is threaded on the tube and held in place by the set screw 36. This upper cap is formed with internal operating threads 38 adapted to engage operating threads 40 formed on the upper portion of operating rod 42 which has the operating hand wheel or similar means 44 secured thereto. The operating rod extends from the top cap through the thrust or supporting tube and through the guide hole 26 in the lower or cage cap into the valve 46.

The lower end of the operating rod is rounded as at 48 to engage a rounded portion of the valve to insure proper alignment. The valve is formed with the usual guide fins 50, and bevel seat 52, and also with the upstanding projection 54 through which bolt 56 may be passed. The bolt 56 is so located as to intersect the normal surface of the rod which has the lower portion removed to form a U-shaped groove 57 to receive the bolts and thus secure the rod and valve together for relative movement. The valve projection and valve rod are provided with openings 58 and 60 respectively through which pin 62 (Figs. 4 and 5) may be inserted when it is desired to grind the valve on its seat.

It is thus seen that the entire valve operating mechanism is supported at the lower portion in the tank, but in order to prevent damage thereto due to surges in the lading a guide 64 is secured to the tank and slidably engages the support tube to prevent lateral movement while permitting vertical movement of the support tube.

In Fig. 6 a slight modification of the top cap securing means is disclosed and in this form a collar 70 is welded or otherwise secured to the support tube and provided with an opening 72. The top cap instead of being threaded on the tube as previously described merely slips over the collar and is held in place by the pin screw 74.

The operation of the valve is as follows: Assuming the parts in the position shown in Fig. 2, rotation of the hand wheel in the proper direction will cause rotation of the valve rod 42 which, due to the interengaging operating threads, will lift the rod vertically. The reaction necessary for this lift is transferred from the top cap through the support or thrust tube to the lower cap and cage and from the cage to the tank shell. Rotation of the wheel in the opposite direction will cause the valve to be seated as is obvious. The rod may rotate freely within the valve due to the slot 57 but any vertical movement of the rod will cause a corresponding movement of the valve due to the bolt 56.

In case it is desired to grind the valve the top cap is disengaged from the thrust or support tube as shown in Fig. 4 and the rod rotated until openings 58 and 60 are in alignment, after which pin 62 may be inserted locking the rod and valve together. Rotation of the hand wheel will now cause rotation of the valve but cannot cause any vertical movement due to the fact that the top cap no longer is engaged with the thrust tube.

It is to be noted that since the entire valve mechanism is connected solely to the bottom of the tank any temperature or other changes cannot affect the valve setting as they otherwise would if the mechanism were in any way anchored to another part of the tank.

The device has been described more or less in detail but it is obvious that various modifications and arrangements may be accomplished by persons skilled in the art without departing from the scope of the invention as defined by the following claim.

What is claimed is:

A tank including top and bottom wall portions, a discharge mechanism for said tank comprising a valve cage secured to the bottom wall portion of the tank and provided with a valve seat and a cap, the latter being formed with an upstanding internally threaded portion and a guide opening, a thrust tube in threaded engagement with the internally threaded portion in the cap and extending through the upper portion of the tank, and being spaced from contact therewith to permit movement independent of the tank, means spaced from the upper tank wall for holding the upper end of the tube against lateral displacement, a cap secured to the upper end portion of said tube, a valve in said valve cage cooperating with said valve seat, a valve mechanism including a vertical rod arranged in said tube, said rod being rotatably and rockably secured to said valve, removable means for locking said valve against rotation with respect to said rod, said rod being arranged in said tube in engagement with the wall of the guide opening, and the upper end of said rod being threadedly connected with the cap whereby rotation of said rod will actuate said valve.

JOHN J. McBRIDE.